(12) United States Patent
Beauvais et al.

(10) Patent No.: US 10,099,662 B2
(45) Date of Patent: Oct. 16, 2018

(54) BRAKING SYSTEMS INCLUDING COMPRESSIBLE MEDIUM TO MODIFY BRAKE FLUID PRESSURE

(71) Applicant: FORD GLOBAL TECHNOLOGIES, LLC, Dearborn, MI (US)

(72) Inventors: Brandon Beauvais, Dearborn, MI (US); Tim Jurkiw, Macomb, MI (US); Dale Scott Crombez, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 345 days.

(21) Appl. No.: 14/645,001

(22) Filed: Mar. 11, 2015

(65) Prior Publication Data

US 2016/0264116 A1    Sep. 15, 2016

(51) Int. Cl.
| | | |
|---|---|---|
| *B60T 8/34* | (2006.01) | |
| *B60T 7/04* | (2006.01) | |
| *B60T 8/32* | (2006.01) | |
| *B60T 8/40* | (2006.01) | |

(52) U.S. Cl.
CPC ............ *B60T 7/042* (2013.01); *B60T 8/326* (2013.01); *B60T 8/4018* (2013.01); *B60T 8/4086* (2013.01); *B60T 2270/404* (2013.01)

(58) Field of Classification Search
CPC ...... B60T 13/662; B60T 13/686; B60T 7/042; B60T 7/22; B60T 8/326; B60T 8/4018; B60T 8/4086; B60T 2270/404
USPC .......................... 303/113.4, 3, 20, 48, 57, 64
See application file for complete search history.

(56) References Cited

U.S. PATENT DOCUMENTS

| | | | |
|---|---|---|---|
| 3,558,123 A | 1/1971 | Yew | |
| 4,708,404 A | 11/1987 | Seibert et al. | |
| 4,799,570 A * | 1/1989 | Andersson | B60T 7/22 180/275 |
| 5,180,216 A | 1/1993 | Kirstein | |
| 5,211,454 A | 5/1993 | Schaefer et al. | |
| 5,803,555 A * | 9/1998 | Schaefer | B60T 8/368 138/30 |
| 8,303,048 B2 | 11/2012 | Anderson et al. | |
| 8,874,343 B2 | 10/2014 | Anderson et al. | |
| 2006/0125315 A1 | 6/2006 | Hool | |
| 2011/0006596 A1 | 1/2011 | Leiber et al. | |
| 2011/0131974 A1 | 6/2011 | Brueggemann et al. | |

(Continued)

FOREIGN PATENT DOCUMENTS

| | | |
|---|---|---|
| DE | 10 2009 047 738 A1 | 6/2011 |
| EP | 1 375 283 A2 | 1/2004 |

*Primary Examiner* — Pamela Rodriguez
(74) *Attorney, Agent, or Firm* — Jones Robb, PLLC; Frank MacKenzie

(57) ABSTRACT

Brake actuators for a motor vehicle braking system, braking systems including the brake actuators, and motor vehicles including the brake actuators are provided. A brake actuator includes a chamber enclosing a volume configured to hold a quantity of brake fluid, a piston, a piston actuator, and a compressible medium. The piston actuator may be coupled to the piston and configured to actuate the piston. The compressible medium may be positioned relative to the chamber such that the compressible medium is subjected to a force due to pressurization of the brake fluid in the chamber. A volume of the compressible medium may be configured to be changed by the force due to the pressurization of the brake fluid.

33 Claims, 3 Drawing Sheets

(56) References Cited

U.S. PATENT DOCUMENTS

2014/0265542 A1     9/2014   Boswell et al.
2017/0106842 A1*   4/2017   Haeusser ............. B60T 8/4068

* cited by examiner

BRAKING SYSTEMS INCLUDING COMPRESSIBLE MEDIUM TO MODIFY BRAKE FLUID PRESSURE

TECHNICAL FIELD

The present disclosure relates to braking systems for motor vehicles including a compressible medium to modify brake fluid pressure, and motor vehicles including such braking systems.

BACKGROUND

When deceleration is requested for a vehicle, the rate at which brake fluid pressure is increased is generally dependent upon the rate at which the driver applies force to the brake pedal. In view of this, brake systems of conventional motor vehicles may include various measures in an attempt to reduce response time of the brake systems. For example, in a conventional motor vehicle, a brake system may pre-charge brake fluid having a fixed volume to an elevated pressure, such as behind a closed valve, or the system may move brake calipers closer to brake rotors in an attempt to slightly reduce response time of the brake system. Pre-charging of the brake fluid or moving the brake calipers closer to the brake rotors can occur, for example, when a driver quickly releases the accelerator pedal, which may indicate a desire to make a rapid stop.

However, pre-charging brake fluid is limited due to the fixed volume of brake fluid in the system. In particular, the moment a valve is opened and the volume of the pre-charged brake fluid changes, the pressure of the pre-charged brake fluid drops due to equalization on both sides of the valve. As a result, the effectiveness of pre-charging the brake fluid is diminished because only a portion of the pre-charged pressure, such as half, is delivered to the remainder of the hydraulic circuit upon opening the valve.

Thus, although brake systems have already contributed to significant improvements in enhancing brake responsiveness, further improvements may be made to braking systems for motor vehicles to further enhance the responsiveness of the braking system.

SUMMARY

In accordance with various exemplary embodiments, the present disclosure provides a brake actuator for a motor vehicle braking system. The brake actuator comprises a chamber enclosing a volume configured to hold a quantity of brake fluid, a piston, a piston actuator, and a compressible medium. The piston actuator may be coupled to the piston and configured to actuate the piston. The compressible medium may be positioned relative to the chamber such that the compressible medium is subjected to a force due to pressurization of the brake fluid in the chamber. A volume of the compressible medium may be configured to be changed by the force due to the pressurization of the brake fluid.

In accordance with various exemplary embodiments, the present disclosure further provides a braking system for a motor vehicle. The braking system comprises at least one brake line and a brake actuator. The at least one brake line is configured to be fluidically coupled to at least one brake device for a wheel of the motor vehicle. The brake actuator may be fluidically coupled to the brake line. The brake actuator comprises a chamber and a compressible medium. The chamber may enclose a volume configured to hold a quantity of brake fluid. The compressible medium may be positioned relative to the chamber such that the compressible medium is subjected to a force due to pressurization of the brake fluid in the chamber. A volume of the compressible medium may be configured to be changed by the force due to the pressurization of the brake fluid.

In accordance with various exemplary embodiments, the present disclosure further provides a method of pre-charging a braking system for a motor vehicle. The method comprises providing a volume of brake fluid in a chamber, closing the chamber, pressurizing the brake fluid in the closed chamber, and changing a volume of a compressible medium positioned relative to the chamber via pressurizing the brake fluid.

Additional objects and advantages of the present disclosure will be set forth in part in the description which follows, and in part will be obvious from the description, or may be learned by practice of the present disclosure. Various objects and advantages of the present disclosure will be realized and attained by means of the elements and combinations particularly pointed out in the appended claims.

It is to be understood that both the foregoing general description and the following detailed description are exemplary and explanatory only and are not restrictive of the present disclosure.

The accompanying drawings, which are incorporated in and constitute a part of this specification, illustrate embodiments of the present disclosure and together with the description, serve to explain the principles of the present disclosure.

BRIEF DESCRIPTION OF THE DRAWINGS

Other advantageous details and effects of the present disclosure are explained in detail below using an exemplary embodiment illustrated in the following figures. In the figures.

DESCRIPTION OF THE EMBODIMENTS

Figure 1:
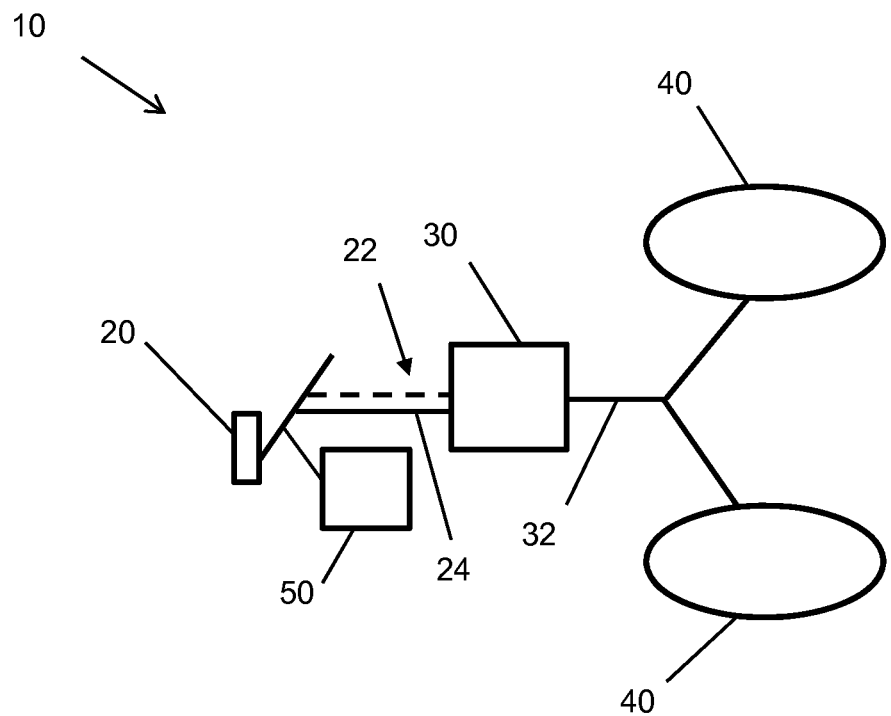
FIG. 1 schematically depicts a braking system of a motor vehicle, in accordance with the present disclosure.

Reference will now be made in detail to various embodiments, examples of which are illustrated in the accompanying drawings. However, these various exemplary embodiments are not intended to limit the disclosure. To the contrary, the disclosure is intended to cover alternatives, modifications, and equivalents. In the drawings and the description, similar elements are provided with similar reference numerals. It is to be noted that the features explained individually in the description can be mutually combined in any technically expedient manner and disclose additional embodiments of the present disclosure.

It is to be noted that the features individually mentioned in the following description can be combined with each other in any technically meaningful manner and reveal further embodiments of the present disclosure.

The various exemplary embodiments described herein contemplate braking systems that include a compressible medium to modify brake fluid pressure. The compressible medium may be subject to the brake fluid pressure of a braking system. As a result, when a portion of the braking system is closed, by, for example, closing a valve, pressure of the brake fluid may be increased to pre-charge the braking system, which also results in deformation (e.g., compression) of the compressible medium. For instance, a volume of the compressible medium may change, such as by reducing in volume. When the portion of the braking system is opened, such as by opening the valve, the compressible medium recovers (e.g., returns to its un-deformed shape) and assists with providing a pressurized brake fluid so that a response time of the braking system is enhanced.

In accordance with the present teachings, the compressible medium may be a spring, a compressible fluid (such as, for example, a compressible gas (e.g., a gas contained within a sealed container)), a rubber element, a non-Newtonian fluid with a shear thickening response, or other compliant material or member. A non-Newtonian fluid with a shear thickening response may be, for example, a non-Newtonian fluid having a viscosity that depends on stress or electrical charge (e.g., current) or the presence of a magnetic field, such as a ferrofluid. The non-Newtonian fluid may act as a static material (e.g., have properties that do not dynamically change) or may provide a dynamic response to changes in stress, electrical charge, or a magnetic field. Further, a compression medium may include more than one material. Therefore a compressible medium may include various materials having different rigidities. For instance, a compressible medium may include combinations of a spring, a compressible fluid (such as, for example, a compressible gas (e.g., a gas contained within a sealed container)), a rubber element, a non-Newtonian fluid with a shear thickening response (e.g., a non-Newtonian fluid having a viscosity that depends on stress and provides a dynamic response to pressure changes, such as, for example, a ferrofluid), or other compliant material or member.

Turning to FIG. 1, a braking system 10 for a motor vehicle is schematically depicted. The braking system 10 includes a brake pedal 20 mounted in the motor vehicle and an actuator 30 coupled to the brake pedal 20. The actuator 30 is coupled to the brake pedal 20 so that when pressure is applied to the brake pedal 20 by a driver, a corresponding amount of pressure is applied by actuator 30 to the brake fluid of the braking system 10. According to an aspect of the disclosure, braking system 10 is a decoupled braking system. In a decoupled braking system, driver input (e.g., force to brake pedal 20) is separated from brake fluid pressure output by the braking system. In such decoupled systems, a mechanical couple, such as between brake pedal 20 and actuator 30 (e.g., rod 24 in FIG. 1), may be provided as a redundant mechanical braking system, such a backup braking system in case actuator 30 fails. Decoupled braking systems include electronic brake boost (EBB) systems and brake-by-wire systems, with brake-by-wire systems lacking a mechanical coupling (e.g. rod 24) between brake pedal 20 and actuator 30.

In an example of a decoupled braking system, when brake pedal 20 is depressed by a driver, the amount of brake pedal depression is detected, such as by a sensor. Actuator 30 may be coupled to brake pedal 20, such as via an electronic connection 22, so that a signal corresponding to the amount of brake pedal depression is provided to actuator 30, which in turn produces an amount of brake fluid pressure corresponding to the amount of brake pedal depression. For example, actuator 30 may be fluidically coupled to wheels 40 of a motor vehicle via a brake line 32 so that the brake fluid pressure produced by actuator 30 is supplied to braking devices (not shown) of wheels 40.

Braking system 10 is schematically depicted in the exemplary embodiment of FIG. 1 and may include other components used in braking systems, such as, for example, other components of a decoupled braking system that are familiar to one of ordinary skill in the art. For example, braking system 10 may include a controller configured to perform the various functions of the exemplary embodiments described herein, such as controlling valves, actuators, and other components of the braking system, receiving signals (e.g., from a sensor detecting motion of brake pedal 20), and/or sending command signals, such as command signals to actuate braking system components based upon signals received by the controller.

Actuator 30 may be, for example, a linear actuator or other type of actuator used for controlling the pressure of a braking system, according to an exemplary embodiment. Because actuator 30 is decoupled from brake pedal 20, changes in brake fluid pressure, such as increases in brake fluid pressure created by actuator 30, are not necessarily felt by a driver through brake pedal 20. For example, braking system 10 may include a brake force simulator 50 that is coupled to brake pedal 20 so brake force simulator 50 may supply a counter pressure to brake pedal 20 to simulate a brake pressure a driver would experience in a motor vehicle having a coupled braking system. When actuator 30 is used to increase brake fluid pressure, such as to enhance responsiveness of braking system 10, the counter pressure supplied by brake force simulator 50 may correspond to a lower pressure than the increase brake fluid pressure, according to an exemplary embodiment. As a result, a driver is not aware of the increased brake fluid pressure, which could otherwise disturb or cause discomfort for the driver.

Figure 2:
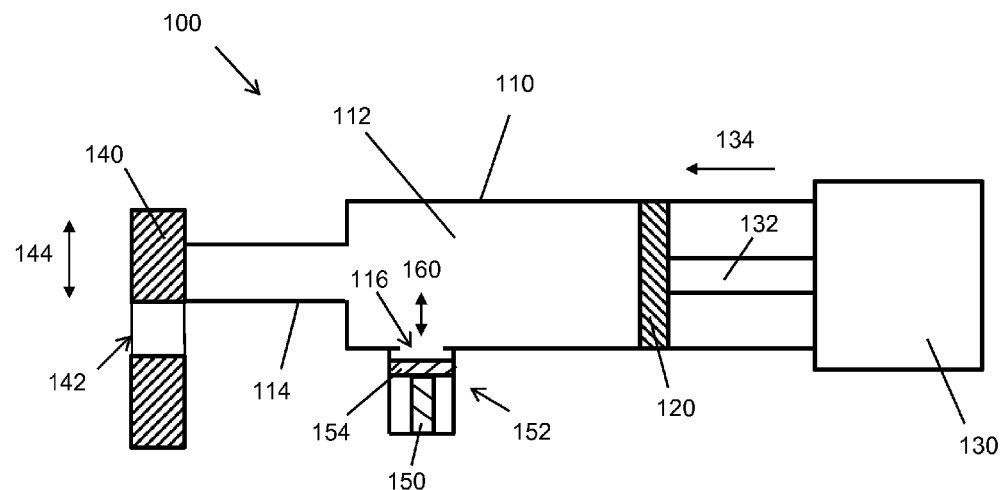
FIG. 2 depicts a section view of a braking system actuator that includes a compressible medium, according to an exemplary embodiment of the present disclosure.
Figure 4:
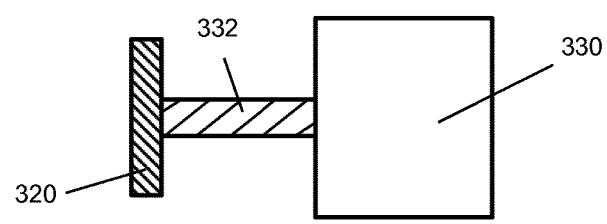
FIG. 4 depicts a section view of a piston and piston actuator arrangement for a braking system actuator, according to another exemplary embodiment of the present disclosure.

FIG. 2 depicts a sectional view of an exemplary embodiment of an actuator 100 for a braking system, such as actuator 30 for braking system 10 of FIG. 1. Actuator 100 may include a chamber 110, such as, for example, a cylinder, enclosing a volume 112 in which brake fluid for a braking system may be contained. Actuator 100 may further include a piston 120 coupled to a piston actuator 130 configured to control movement of piston 120 within chamber 110. Piston actuator 130 may be, for example, a motor, piston cylinder, or other type of actuator configured to drive piston 120, such as via a rod or shaft 132. For example, as depicted in FIG. 4, piston 320, shaft 322, and piston actuator 330 may have a ball screw arrangement in which rotational motion of shaft 332, which may be a screw, is provided by actuator 330 and converted to linear motion of piston 320. According to an exemplary embodiment, piston 130 is movably sealed within chamber 110, such as via a ring (not shown) or other sealing device familiar to one of ordinary skill in the art, so brake fluid is contained within volume 112 of chamber 110.

Actuator 100 further includes a valve 140 to control the flow of brake fluid from actuator 100 to brake line(s) 32, according to an exemplary embodiment. For example, valve 140 may include a valve orifice 142 to permit brake fluid to flow from chamber 112 to a remainder of braking system (e.g., through brake line 32 to brake devices of wheels 40 in FIG. 1) when valve orifice 142 is aligned with an outlet 114 of chamber 110. According to an exemplary embodiment, valve 140 may be moved relative to valve outlet 114 to open and close chamber 110. For example, valve 140 may be moved in a direction defined by arrows 144 (e.g., by a valve actuator, not shown) in FIG. 2 to close volume 112 of chamber 110 (e.g., when valve 140 is in in the position depicted in FIG. 2) or permit brake fluid to flow from chamber 110 (e.g., when valve orifice 142 is aligned with outlet 114). As will be understood by those of skill in the art, other valve arrangements, for example, may be used, such as rotatable valves, feed valves, outlet/inlet valves, or other types of valves familiar in the art.

Although a single valve (e.g., valve 140) is illustrated in the drawings for the various exemplary embodiments described herein, more than one valve may be used instead of a single valve. The one or more valves (e.g., valve 140) may be used to control or isolate brake fluid pressurized by actuator 100 with respect to a remainder of a braking system including actuator 100. For example, valve 140 (as well as valves 240 and 440 discussed below) may represent one or more valves used to control the flow of brake fluid from an actuator (e.g., actuator 100, 200, 400) to circuits supplying brake fluid pressure to vehicle wheels, such as via a front/rear circuit split or cross-vehicle (e.g., diagonal) split. Valves 140, 240, 440 may represent more than one valve, such as, for example, two valves, with each valve controlling the flow of brake fluid from an actuator (e.g., actuator 100, 200, 400) to a respective circuit that supplies the brake fluid to the vehicle wheels. Thus, when the one or more valves schematically represented by each of valves 140, 240, 440 are closed, brake fluid within an actuator (e.g. actuator 100, 200, 400) is contained and pressurized when the actuator is activated, and the pressure produced by the actuator is not delivered to the vehicle wheels via the respective circuits until the valves are opened.

A braking system (e.g., braking system 10) may include a controller (not shown) configured to control components of actuator 100, such as, for example, piston actuator 130, valve 140, and/or other components of actuator 100. The controller may be in communication with other controller(s) of a vehicle, or may be a part (e.g., section) of a vehicle controller that controls other systems/components of a motor vehicle. The controller may receive one or more signals indicating that a sudden stop is about to occur and determine whether valve 140 should be open or closed. For example, the controller may be coupled to a sensor that determines whether a driver quickly releases the accelerator pedal, a sensor detecting an obstacle in a path of a motor vehicle, or sensor detecting another event.

The configuration of the controller is subject to a variety of implementation-specific variations. For example, in some embodiments, the functions described in reference to the controller may be performed across multiple control units or among multiple components of a single controller. Further, the controller may include one or more structural components (e.g., microprocessors) that provide the function of a controller. Any controllers or processors disclosed herein, may include one or more non-transitory, tangible, machine-readable media, such as read-only memory (ROM), random access memory (RAM), solid state memory (e.g., flash memory), floppy diskettes, CD-ROMs, hard drives, universal serial bus (USB) drives, any other computer readable storage medium, or any combination thereof. The storage media may store encoded instructions, such as firmware, that may be executed by a control system or controller to operate the logic or portions of the logic presented in the methods disclosed herein. For example, in certain embodiments, the controller may include computer code disposed on a computer-readable storage medium or a process controller that includes such a computer-readable storage medium. The computer code may include instructions, for example, for controlling components of a brake system actuator, such as controlling a valve of the actuator based on feedback received from another component of the vehicle.

Actuator 100 is used to increase the pressure of brake fluid for a braking system, such as to limit or decrease the time it will take to initiate braking of a motor vehicle, when requested by driver input or vehicle sensor input. For instance, when an event occurs that indicates a sudden stop may be about to occur, such as, for example, a driver quickly releasing the accelerator pedal, a sensor detecting an obstacle in a path of a motor vehicle, or another event, actuator 100 may be used to increase brake fluid pressure, such as when valve 140 is open (e.g., valve orifice 142 is aligned with outlet 114 to permit fluid egress) and actuator 100 is fluidically coupled to the rest of the braking system. However, the activation of actuator 100 to increase brake fluid pressure takes a finite amount of time. For example, a finite amount of time is required for the control steps for activation of actuator 100 and piston actuator 130 requires time to actuate to the point of moving piston 120.

Actuator 100 may be configured to pre-charge the pressure of braking fluid within actuator 100 to enhance the responsiveness of braking (e.g., when valve 140 is opened to provide increased brake fluid pressure from actuator 100). According to an exemplary embodiment, valve 140 may be closed (e.g., placed in the position depicted in FIG. 2), such as when an event occurs indicating a sudden stop may be about to occur, so the pressure of brake fluid contained within volume 112 may be increased. For example, piston actuator 130 may be controlled to move piston 120 along direction 134 shown in FIG. 2. Thus, the brake fluid pressure is pre-charged in an effort to enhance the responsiveness of a braking system including actuator 100. However, because a brake system including actuator 100 typically has a fixed volume for its brake fluid and the brake fluid is incompressible, when valve 140 is opened, the volume of the pressurized brake fluid within volume 112 would normally drop as the brake fluid pressure equalizes on both sides of valve 140. As a result, only a portion of the pre-charged brake fluid pressure would be delivered to the remainder of the braking system's hydraulic circuit when valve 140 is opened.

In view of this consideration, actuator 100 includes a compressible medium 150 to enhance the responsiveness of actuator 100, according to an exemplary embodiment. Compressible medium 150 may be in communication with the brake fluid within volume 112 so that compressible medium 150 is subjected to a force due to the pressure of the brake fluid within volume 112. Compressible medium 150 may be configured to deform (e.g., compress) when the pressure of brake fluid within volume 112 is increased, such as when valve 140 is closed and the actuator 100 increases the brake fluid pressure. For example, a volume of compressible medium 150 may change, such as by reducing in volume. When valve 140 is opened to commence braking by supplying increased brake fluid pressure from actuator 100, compressible medium 150 is configured to recover (e.g., return to a non-deformed or non-compressed state), according to an exemplary embodiment. As compressible medium 150 recovers, it exerts pressure upon the brake fluid in volume 112 so that the drop in brake fluid pressure, which normally occurs when valve 140 is opened, is reduced or eliminated. Thus, the responsiveness of a braking system including actuator 100 is enhanced because actuator 100 supplies brake fluid at a higher pressure at an earlier time.

According to an exemplary embodiment, the recovery of compressible medium 150 commences the instant the valve 140 is opened. As a result, there is no need to wait for the pressure supplied by compressible medium 150. In addition, because compressible medium 150 can be used to provide increased brake fluid pressure when valve is opened 140, piston actuator 130 may be actuated to a lower level to pre-charge the brake fluid pressure of actuator 100 when valve 140 is closed, permitting piston actuator 130 to use less power than when compressible medium 150 is not present.

Figure 5:
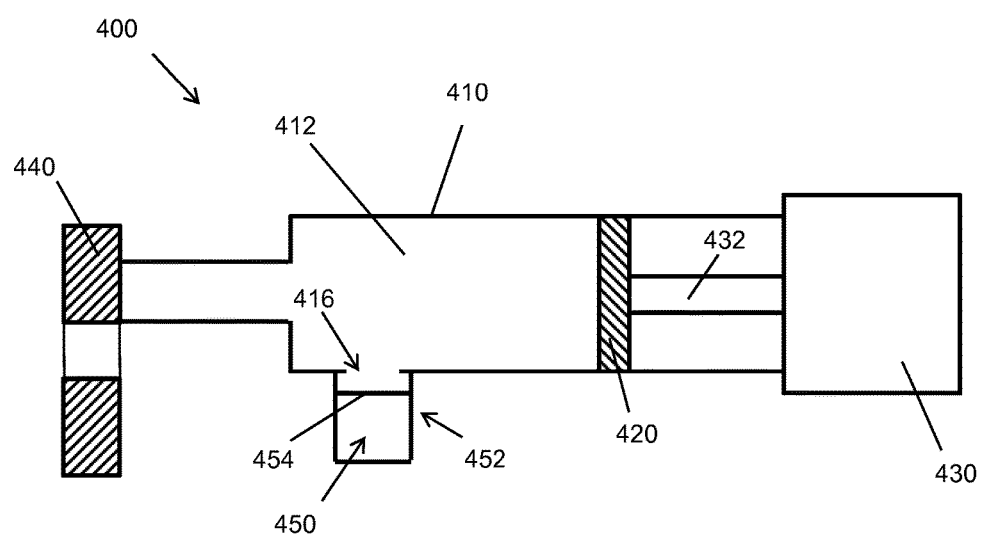
FIG. 5 depicts a section view of a braking system actuator that includes a compressible medium, according to another exemplary embodiment of the present disclosure.

Compressible medium 150 can be a material that deforms under pressure (e.g., reduces in volume), such as, for example a compliant material. According to an exemplary embodiment, compressible medium may be a spring, a compressible fluid (such as, for example, a compressible gas), a rubber element, a non-Newtonian fluid with a shear thickening response (e.g., a non-Newtonian fluid having a viscosity that depends on stress and provides a dynamic response to pressure changes, such as, for example, a ferrofluid), or other compliant material or member. For example, compressible medium 150 may be a solid member, such as a spring, rubber element, or other solid, deformable material, as depicted in the exemplary embodiment of FIG. 2 (with the cross-hatching utilized in FIG. 2 not limiting compressible medium 150 to any particular material). The solid compressible medium 150 may be connected to a diaphragm 154, which will be discussed below, as shown in FIG. 2. Other configurations may be utilized when the compressible medium is a non-solid material. As depicted in FIG. 5, an actuator 400 may include a chamber 410 enclosing a volume 412, a piston 420, a piston actuator 430, a shaft 432, a valve 440, and a non-solid compressible medium 450. The non-solid compressible medium 450 may be located within a compressible medium chamber 452 having an orifice 416, as discussed above with regard to the exemplary embodiment of FIG. 2. The compressible medium 450 may be, for example, a fluid (e.g., a gas, gel, non-Newtonian fluid, or other non-solid compressible medium) located within compressible medium chamber 452. The compressible medium chamber 452 may be sealed to contain compressible medium 450 within chamber 452, such as via a diaphragm 454 (which may include a ring or other sealing device familiar to one in the art) or by containing the compressible medium 450 within a sealed contained (not shown) that may be connected to diaphragm 454, such as by making diaphragm a surface of the container facing orifice 416.

As shown in the exemplary embodiment of FIG. 2, compressible medium 150 may be located within a compressible medium chamber 152 that is fluidically connected to the volume 112 of chamber 110. As a result, compressible medium 150 may be subjected to the pressure of brake fluid within volume 112, such as when piston 120 is actuated to increase the pressure, while locating compressible medium 150 out of the path of piston 120 so compressible medium 150 does not interfere with the actuation of piston 120. For example, as depicted in the exemplary embodiment of FIG. 2, compressible medium chamber 152 may be located lateral to, and fluidically coupled with, the portion of volume 112 within which piston 120 reciprocates. According to an exemplary embodiment, compressible medium chamber 152 may be fluidically connected to brake fluid within volume 112 via an orifice 116 formed in chamber 110. The size (e.g., diameter) of orifice 116 may be selected to maximize the fluid output rate from compressible medium chamber 152 to volume 112. According to an exemplary embodiment, the size of orifice 116 is adjustable and controllable, such as via the controller of the braking system. Compressible medium chamber 152 can act as a reservoir for pressurized brake fluid, such as when compressible medium 150 is deformed (e.g., reduced in volume) by the pressure of brake fluid in volume 112. That is, as pressure in the brake fluid is increased, compressible medium 150 will compress within compressible medium chamber 152, allowing brake fluid to move into compressible medium chamber 152.

According to an exemplary embodiment, compressible medium 150 can have predetermined rigidity (e.g., stiffness), so that when valve 140 is open to supply pressurized brake fluid to the rest of a brake system (e.g., brake system 10), such as by actuating piston actuator 130, compressible medium 150 does not substantially deform (e.g., does not undergo a significant amount of deformation, such as a significant change in volume). According to an exemplary embodiment, compressible medium 150 may provide a brake fluid pressure based on anticipated locking pressures of vehicle wheels. Because locking pressures may vary, such as due to vehicle mass, compressible medium 150 may provide a brake fluid pressure of, for example, about 60 bars to about 120 bars. According to another embodiment, compressible medium 150 may provide a brake fluid pressure of, for example, about 70 bars to about 100 bars. As a result, compressible medium 150 does not have a significant effect on brake fluid pressure during normal operation of the braking system, such as when a sudden stop does not occur. When valve 140 is closed to pre-charge actuator 100, such as by driving piston 120 to pressurize brake fluid in volume 112, the increased pressure causes compressible medium 150 to deform (e.g., change in volume), as described above. The material and/or geometry (e.g., shape and/or dimensions) of compressible medium 150 may be selected to provide compressible medium 150 with a desired rigidity.

As discussed above, a diaphragm 154 may be provided with the compressible medium, as shown in the exemplary embodiment of FIG. 2. Diaphragm 154 may seal compressible medium chamber 152, such as to contain compressible medium 150 within compressible medium chamber 152, while also transmitting the pressure of brake fluid within volume 112 to the compressible medium 150. According to an exemplary embodiment, diaphragm 154 may be configured to act like a piston. For example, diaphragm 154 may be configured to move in the direction identified by arrows 160 in FIG. 2. Such movement is responsive to changes in the pressure of the brake fluid contained in volume 112. In another example, at least a portion of diaphragm 154 (e.g., at least a central portion) may deform under the pressure exerted by the brake fluid such that the pressure is transmitted to the compressible medium 150 within compressible medium chamber 152. According to an exemplary embodiment, compressible medium 150 may be attached to diaphragm 154, such as when the compressible medium 150 is a spring, rubber member, or other type of solid compressible medium. Diaphragm 154 may be configured to uniformly move along the directions identified by arrows 160 when force is applied to diaphragm 154 to facilitate sealing between diaphragm 154 and the wall of chamber 152 and minimize or prevent fluid within volume 112 flowing past diaphragm 154 into chamber 152.

Figure 3:
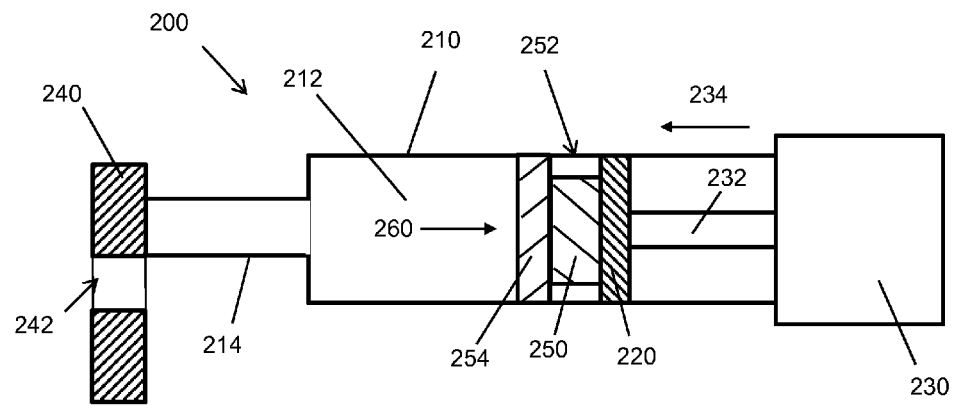
FIG. 3 depicts a section view of an alternative braking system actuator that includes a compressible medium, according to another exemplary embodiment of the present disclosure.

Other configurations for a compressible medium are envisioned by the present disclosure. Turning to FIG. 3, an exemplary embodiment of an actuator 200 is depicted that includes a chamber 210 enclosing a volume 212 and having an outlet 214, a piston 220, a piston actuator 230 to actuate piston 220 (e.g., such as via a shaft 232), and a valve 240 having a valve orifice 242, as discussed above with regard to the exemplary embodiment of FIG. 2. A braking system including actuator 200 may include a controller (not shown) to control the components of actuator 200, as described above with regard to the exemplary embodiment of actuator 100. Actuator 200 may function as described above with regard to the exemplary embodiment of FIG. 2, except that actuator 200 includes a compressible medium 250 attached to piston 220. As a result, when valve 240 is closed (as depicted in the position shown in FIG. 3), piston 220 may be actuated to increase the pressure of brake fluid within volume 212 and cause compressible medium 250 to deform (e.g., change in volume) For example, compressible medium 250 may compress along direction 260 in FIG. 3. When valve 240 is opened, compressible medium 250 may recover, as described above with regard to the exemplary embodiment of FIG. 2 to enhance the responsiveness of actuator 200 and a braking system including actuator 200.

Because compressible medium 250 is attached to piston 220, compressible medium 250 does not significantly interfere with the actuation of piston 220 because compressible medium 250 travels with piston 220 as piston 220 is actuated. Compressible medium 250 may be made of the materials described above with regard to the exemplary embodiment of FIG. 2. For example, if compressible medium 250 comprises a solid member (e.g., a spring, rubber member, or other type of solid compressible medium), compressible medium 250 may be attached to piston 220, as depicted in the exemplary embodiment of FIG. 2. In another example, if compressible medium comprises a non-solid material, such as a compressible gas, gel, non-Newtonian fluid, or other compressible fluid, the compressible medium may be contained within a volume or within a sealed container (not shown), as discussed above with regard to FIG. 5, which is located at end of piston 220. For example, a diaphragm 254 may be provided with compressible medium 250, such as to seal the brake fluid within volume 212 off from compressible medium 250, while transmitting pressure from the brake fluid to the compressible medium 250.

A region between diaphragm 254 and piston 220 may act as a compressible medium chamber 252, according to an exemplary embodiment. According to an exemplary embodiment, diaphragm 254 may be configured to act like a piston, such as by moving with piston 220. When the compressible medium 250 is sealed within a volume or within a container (such as when the compressible medium 250 is a gas, gel, liquid, or other non-solid material), diaphragm 254 may form at least a portion of a surface of the container exposed to the brake fluid within volume 212, so that a force due to pressure of brake fluid within volume 212 may be transmitted to the compressible medium 250 via diaphragm 254, according to an exemplary embodiment.

The various exemplary embodiments described herein may be used with braking systems that use ABS. At the onset of a hold phase of an ABS system, when inlet valves (e.g., valves within circuits supplying brake fluid to the wheels of a vehicle) close, a brake fluid generation device may undergo a large pressure spike as the device stops. The present disclosure contemplates addressing this issue. For example, compressible mediums of the various exemplary embodiments described herein may provide brake fluid pressures to correspond to a wheel lock pressure, as described above. When approaching the threshold between maximum utilization of tire adhesion to a ground surface and wheel slip (e.g., rubber shear) during ABS, the compressible medium would have the added benefit of damping an impending over-shoot of a target pressure, providing an ABS braking system with more time to respond, slow in response speed, and approach the threshold with enhanced accuracy.

When brake fluid pressure is intended to increase during conventional ABS, precise timing of actuator movement is desired for effective ABS output. The valves of the brake systems described herein (e.g., valves 140, 240, 440, and the valves they schematically represent) can be used to control increases in brake pressure during ABS by closing the valves to create increases in brake fluid pressure, such as over short intervals during an ABS dump phase, to create a prepared head pressure for when a build phase is required, allowing instantaneous an response. For example, during ABS braking, the valve (e.g., valve 140, 240 in FIGS. 1 and 2, including the valves they schematically represent) could be opened and closed to control brake fluid pressure supplied by the actuator (e.g., actuator 100, 200). When the valve is closed, the piston actuator (e.g., piston actuator 130, 230) could be controlled to increase brake fluid pressure within the actuator, causing the compressible medium (e.g., compressible medium 150, 250) to deform so that when the valve is opened, the compressible medium enhances the responsiveness of the actuator to supply increased fluid pressure to the braking system. As a result, precise modulation of brake fluid pressure is provided with fewer overshoots of the threshold between maximum utilization of tire adhesion to a ground surface and wheel slip (e.g., rubber shear) during ABS. Actuators may be used to pressurize brake fluid during the dump phase. Further, because the compressible medium supplies brake fluid at an increased pressure when the valve is opened, the piston actuator may be actuated to a lower level (e.g., use less power) during ABS braking, in comparison to actuators that do not include a compressible medium.

Although the various exemplary embodiments have been described herein with regard to decoupled braking system, the present disclosure contemplates using the actuators described herein with coupled braking systems. For example, the actuators described herein could be used to pre-charge a brake fluid pressure during ABS braking when the valve of the actuator is closed. In such coupled systems, the compressible medium may be selected to have a predetermined rigidity (e.g., stiffness) so the compressible medium is not deformed during braking of the coupled system but deforms during ABS braking when the valve of the actuator is closed.

The various exemplary embodiments described herein provide efficient, low cost braking systems with enhanced responsiveness when supplying brake fluid at increased pressure, such as when braking is desired for a sudden stop.

Further modifications and alternative embodiments will be apparent to those of ordinary skill in the art in view of the disclosure herein. For example, the systems and the methods may include additional components or steps that were omitted from the diagrams and description for clarity of operation. Accordingly, this description is to be construed as illustrative only and is for the purpose of teaching those skilled in the art the general manner of carrying out the present teachings. It is to be understood that the various embodiments shown and described herein are to be taken as exemplary. Elements and materials, and arrangements of those elements and materials, may be substituted for those illustrated and described herein, parts and processes may be reversed, and certain features of the present teachings may be utilized independently, all as would be apparent to one skilled in the art after having the benefit of the description herein. Changes may be made in the elements described herein without departing from the spirit and scope of the present teachings and following claims.

This description and the accompanying drawing that illustrates exemplary embodiments of the present teachings should not be taken as limiting. Various mechanical, compositional, structural, electrical, and operational changes may be made without departing from the scope of this description and the claims, including equivalents. In some instances, well-known structures and techniques have not been shown or described in detail so as not to obscure the disclosure. Like numbers in two or more figures represent the same or similar elements. Furthermore, elements and their associated features that are described in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the various exemplary embodiments described herein. At the very least, and not as an attempt to limit the application of the doctrine of equivalents to the scope of the claims, each numerical parameter should at least be construed in light of the number of reported significant digits and by applying ordinary rounding techniques.

It is noted that, as used in this specification and the appended claims, the singular forms "a," "an," and "the," include plural referents unless expressly and unequivocally limited to one referent. Thus, for example, reference to "a sensor" includes two or more different sensors. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the system and method of the present disclosure without departing from the scope its disclosure. It is to be understood that the particular examples and embodiments set forth herein are non-limiting, and modifications to structure, dimensions, materials, and methodologies may be made without departing from the scope of the present teachings. Other embodiments of the disclosure will be apparent to those skilled in the art from consideration of the specification and practice of the disclosure disclosed herein. It is intended that the specification and embodiment described herein be considered as exemplary only.

What is claimed is:

1. A brake actuator for a motor vehicle braking system, comprising:
   a chamber enclosing a volume configured to hold a quantity of brake fluid;
   a piston;
   a piston actuator coupled to the piston and configured to actuate the piston; and
   a compressible medium positioned relative to the chamber such that the compressible medium is subjected to a force by the brake fluid due to pressurization of the brake fluid in the chamber, wherein a volume of the compressible medium is configured to be changed by the brake fluid force.

2. The brake actuator of claim 1, further comprising a controller and a valve, wherein the controller is configured to close the valve to close the volume of the chamber and the controller is configured to control the piston actuator to actuate the piston when the valve is closed to increase the pressure of the brake fluid in the volume, causing the compressible medium to change in volume.

3. The brake actuator of claim 2, wherein the controller is configured to open the valve after the pressure of the brake fluid is increased, wherein the compressible medium returns to an undeformed shape when the valve is opened.

4. The brake actuator of claim 2, wherein the compressible medium has a rigidity such that the compressible medium remains undeformed when the valve is open.

5. The brake actuator of claim 1, wherein compressible medium comprises at least one of a spring, a rubber element, and a compressible fluid.

6. The brake actuator of claim 1, further comprising a diaphragm located between the brake fluid and the compressible medium, wherein the diaphragm is configured to transmit the pressure of the brake fluid to the compressible medium.

7. The brake actuator of claim 1, wherein the compressible medium is located within a compressible medium chamber connected to the volume of the chamber via an orifice.

8. The brake actuator of claim 7, further comprising a diaphragm located between the volume of the chamber configured to hold the quantity of the brake fluid and the compressible medium, wherein the diaphragm is configured to transmit the pressure of the brake fluid to the compressible medium.

9. The brake actuator of claim 8, wherein the diaphragm seals the compressible medium chamber.

10. The brake actuator of claim 1, wherein the compressible medium is attached to the piston and moves with the piston.

11. The brake actuator of claim 10, further comprising a diaphragm located between the volume of the chamber configured to hold the quantity of the brake fluid and the compressible medium, wherein the diaphragm is configured to transmit the pressure of the brake fluid to the compressible medium.

12. The brake actuator of claim 11, wherein the diaphragm seals the brake fluid from the compressible medium.

13. A braking system for a motor vehicle, the braking system comprising:
    at least one brake line configured to be fluidically coupled to at least one brake device for a wheel of the motor vehicle; and
    a brake actuator fluidically coupled to the brake line, the brake actuator comprising:
        a chamber enclosing a volume configured to hold a quantity of brake fluid; and
        a compressible medium positioned relative to the chamber such that the compressible medium is subjected to a force by the brake fluid in the chamber, due to pressurization of the brake fluid.

14. The system of claim 13, wherein the braking system is a decoupled braking system.

15. The system of claim 14, further comprising a brake force simulator configured to be coupled to a brake pedal of the motor vehicle.

16. The system of claim 13, further comprising a piston, a piston actuator coupled to the piston and configured to actuate the piston, a valve configured to close the volume of the chamber, wherein a controller is configured to close the valve to close the volume of the chamber and the controller is configured to control the piston actuator to actuate the piston when the valve is closed to increase the pressure of the brake fluid in the volume and cause the compressible medium to change in volume.

17. The system of claim 16, wherein the controller is configured to open the valve after the pressure of the brake fluid is increased, wherein the compressible medium returns to an undeformed shape when the valve is opened.

18. The system of claim 16, wherein the compressible medium has a rigidity such that the compressible medium remains undeformed when the valve is open.

19. The system of claim 13, wherein compressible medium is selected from the group consisting of: a spring, a rubber element, and a compressible fluid.

20. A motor vehicle, comprising a braking system according to claim 13.

21. A method of pre-charging a braking system for a motor vehicle, comprising:
completely closing a chamber containing a volume of brake fluid;
pressurizing the brake fluid in the closed chamber; and
changing a volume of a compressible medium positioned relative to the chamber by a pressure of the brake fluid.

22. The method of claim 21, wherein completely closing the chamber comprises actuating a valve.

23. The method of claim 22, wherein the pressurizing comprises actuating a piston.

24. The method of claim 21, wherein changing a volume of the compressible medium positioned relative to the chamber includes transmitting the pressure of the brake fluid to the compressible medium via a diaphragm.

25. The method of claim 21, wherein changing a volume of a compressible medium positioned relative to the chamber includes compressing a fluid disposed in a compressible medium chamber.

26. The method of claim 21, wherein completely closing the chamber initiates a pressurizing process for a brake actuator, formed in part by the chamber.

27. A brake actuator for a motor vehicle braking system, comprising:
a chamber enclosing a volume configured to hold a quantity of brake fluid;
at least one element configured to pressurize brake fluid in the chamber; and
a compressible medium positioned relative to the chamber such that a force created by brake fluid pressurization varies a volume of the compressible medium.

28. The brake actuator of claim 27, wherein the compressible medium is spaced away from the at least one element configured to pressurize brake fluid in the chamber.

29. The brake actuator of claim 27, wherein the at least one element is a piston coupled to and actuatable by a piston actuator.

30. The brake actuator of claim 27, wherein the compressible medium comprises at least one of a spring, a rubber element, and a compressible fluid.

31. The brake actuator of claim 27, further comprising a piston coupled to and actuatable by a piston actuator and a valve configured to close the volume of the chamber, wherein a controller is configured to close the valve to close the volume of the chamber and the controller is further configured to control the piston actuator to actuate the piston when the valve is closed to increase the pressure of the brake fluid in the volume and cause the compressible medium to change in volume.

32. The brake actuator of claim 31, wherein the compressible medium is connected to the piston.

33. The brake actuator of claim 27, further comprising a diaphragm located between the brake fluid and the compressible medium, wherein the diaphragm is configured to transmit the force created by brake fluid pressurization to the compressible medium.

* * * * *